Patented Dec. 17, 1935

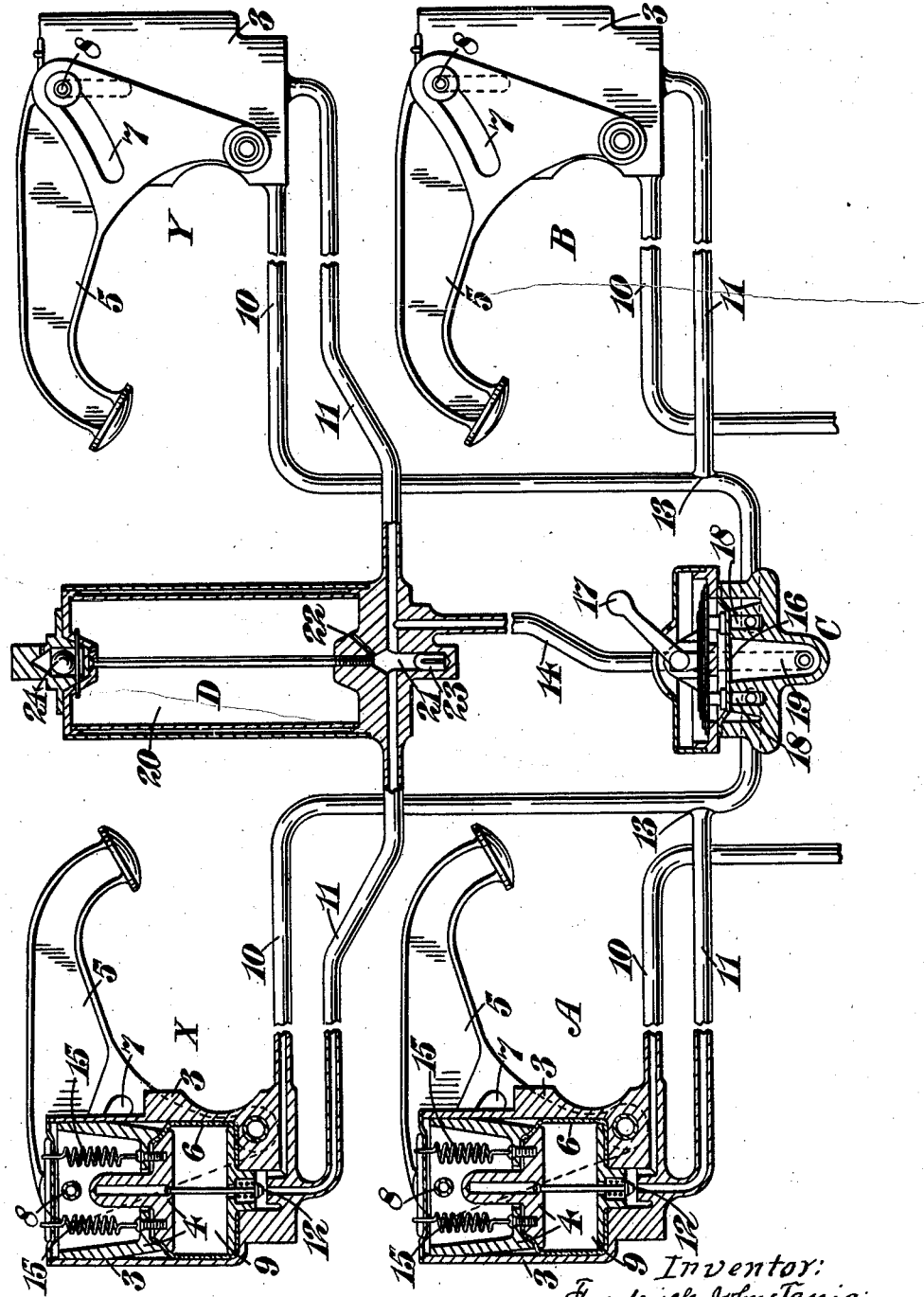

2,024,549

UNITED STATES PATENT OFFICE 2,024,549

CONTROL SYSTEM FOR BRAKES FOR THE WHEELS OF AIRCRAFT

Frederick John Tarris, London, England, assignor to The India Rubber, Gutta Percha and Telegraph Works Company Limited, London, England, a British company Application December 26, 1933, Serial No. 703,968 In Great Britain January 4, 1933

11 Claims. (Cl. 244—29)

This invention comprises improvements in or relating to control mechanisms for the operation of brakes for the wheels of aircraft and in particular relates to that type of control mechanism in which the brakes may be operated from either of two control positions in the aircraft.

The invention is very advantageous in aircraft irrespective of their use and particularly advantageous in aircraft used for training purposes during which use one (or the first) control position is that occupied by the instructor and the second control position is that occupied by the pupil. Throughout the present specification and claims therefor the two control positions will be designated as "the instructor's position" and "the pupil's position" respectively. Similarly actuators, for effecting operation of the brakes, located at these respective positions will be referred to as the "instructor's actuator (or actuators)" and the "pupil's actuator (or actuators)". It is to be understood however that these terms are used only for the purpose of differentiating two control positions in an aircraft having means for dual control and are not intended to limit the scope of the invention in any way.

According to the present invention a control mechanism for the operation of aircraft wheel brakes, comprising actuators situated in the aircraft at an instructor's position and also at a pupil's position from either of which positions the brakes may be operated by said actuators, is provided with means operable from the instructor's position to render the actuator (or actuators) at the pupil's position inoperative upon the brake or brakes and at the same time leave the instructor's actuator (or actuators) capable of operation upon the brake or brakes.

Preferably in such a control mechanism an operative connection between an actuator at the pupil's position and a wheel brake or brakes is, at an intermediate point in said operative connection, coupled to an actuator at the instructor's position in such a manner that operation of the last-mentioned actuator renders the aforesaid pupil's actuator inoperative.

Fluid conduits are arranged to provide communication between the instructor's and the pupil's actuators and the brake mechanism, and there is conveniently provided means operable at will from the instructor's position to cut off said communication between the pupil's actuator (or actuators) and the brake mechanism and also to divert away from the latter pressure fluid subject to the control of the pupil's actuator (or actuators) without interruption of communication between the instructor's actuator (or actuators) and the brake mechanism.

Preferably, in the form of construction last referred to, each control position is provided with an actuator or actuators whereof each comprises a pressure producing device and whereof the instructor's actuator (or each of them) is in direct communication with the brake mechanism and the pupil's actuator (or each of them) is in communication with the brake mechanism through the intermediary of a valve combined with operating means therefor operatively connected to the corresponding instructor's actuator so as to open the valve only when the said instructor's actuator is in or is approximately in an inoperative position, and there is further provided a reservoir or expansion chamber and means operable at will from the instructor's position for diverting to said reservoir or expansion chamber pressure liquid from the pupil's actuator (or each of them) with which the said means is in direct communication.

In a control mechanism according to the invention for aircraft wheel brakes operated by fluid pressure the conduit providing communication between the pupil's actuator and the brake mechanism preferably comprises, as part of it, the whole or a portion of the conduit providing communication between the instructor's actuator and the brake mechanism, a valve being provided to control the conduit leading from the pupil's actuator to the junction with the conduit leading from the instructor's actuator.

Again in a control mechanism as previously described for brakes operated by liquid under pressure there is preferably provided a conduit forming a by-pass to the reservoir or expansion chamber and joining the connection between the pupil's actuator (or each of them) and the instructor's actuator, a valve in said conduit and operating means for said valve operable at will from the instructor's position. Preferably also a conduit connects the pupil's actuator (or each of them) with the reservoir or expansion chamber and is provided with a valve which is such as to allow liquid to flow from the reservoir into the actuator only when the latter is in or approximately in a normal inoperative position of rest.

In some cases all the wheel brakes of the aircraft may be controlled by a single control mechanism according to this invention, but preferably the brake or brakes of the wheel or wheels on one side of the aircraft are controlled by one mechanism according to this invention and the brake or brakes on the wheel or wheels on the other side of the aircraft are controlled by another similar mechanism. According to the latter arrangement the brakes may be used for the purpose of steering the aircraft when on the ground. With such a construction with the brakes operated by liquid under pressure, the two control mechanisms are provided with a single reservoir or expansion chamber to receive the pressure liquid directed from the pupil's actuators.

The accompanying drawing shows the arrangement of parts in one constructional form of the invention, in which form separate control mechanisms are respectively provided for liquid operated brakes on opposite sides of the fore and aft centre line of the aircraft, the two control mechanisms having a common reservoir.

Referring to the drawing, A and B indicate generally the two actuators of the first or instructor's control position in the aircraft and X and Y similarly indicate the two actuators of the second or pupil's control position. The actuators A and X belong to one of the two separate control systems and the actuators B and Y to the other.

Each actuator comprises a cylinder 3 having a piston 4 movable therein upon the actuation of a pivoted pedal 5, the said piston being connected in a known manner to the wall of the cylinder 3 by a flexible folding diaphragm 6. Movement of the piston 4 by the pedal 5 is effected through a cam slot 7 in the pedal which engages the end of a gudgeon pin 8 extending from the piston through a slot in the wall of the cylinder 3. These slots are shown in dotted lines in the actuators B and Y in which they are located behind the pedals 5. The piston 4 is urged by springs 15 to the position in which the pressure chamber 9 enclosed by the diaphragm 6 is of maximum capacity. The pressure chamber 9 of each of the actuators A and B communicates freely with a conduit 10 leading to the braking mechanism and also communicates with a conduit 11 through a valve 12 which is arranged substantially as described in U. S. Patent No. 1,887,880 and which is only open to permit the flow of fluid from the chamber 9 to the said conduit 11 when the piston 4 is in or is approximately in a position which provides the maximum capacity of the chamber 9, or in other words, when the lever 5 is in or approximately in its normal position of rest. The said valve is such, however, as to permit fluid under substantial pressure to flow in the reverse direction, i. e. from the said conduit 11 into the chamber 9.

This operation of the valve 12 is effected by means of valve-spring 120 acting on the head of the valve and tending to effect its closure, and by means of the connection between the valve-stem 121 and the piston 4 which has a slot 122 to accommodate the valve-stem 121. The slot 122 is formed to co-operate at one end with the end of the valve-stem 121 when the piston 4 is at, or approximately at, that position affording a maximum volume of the chamber 9, and this co-operation is such as to move the valve off its seat against the action of the valve-spring 120.

The conduit 10 connected to the actuator A communicates with the brake or brakes on one side of the fore and aft centre line of the aircraft and that of the actuator B with the brake or brakes on the other side of the aforesaid centre line.

The pressure chamber 9 of each of the actuators X and Y communicates freely with a conduit 110 and also communicates with a conduit 111 through a valve 12 similar in construction to the valve 12 provided in each of the actuators A and B.

Conduits 110 connected to the actuators X and Y respectively communicate through a three-way junction 13 with the conduits 11 connected to the actuators A and B. The other conduit 112 from each junction 13 communicates through a valve indicated generally at C with a reservoir or expansion chamber indicated generally at D. Each conduit 111 of the actuators X and Y communicates directly with the reservoir or expansion chamber D.

The valve C comprises a diaphragm 16 which can be thrust downwards by means of a cam capable of holding it in this position and provided with an operating lever 17. The lever 17 is operable from a position in the vicinity of the instructor's position. In the position described the diaphragm 16 shuts off communication between the cavities 18, which communicate with the conduits 112 leading from the junctions 13, and the chamber 19 which communicates by means of a conduit 14 with the reservoir D.

The cam 161 acts upon the diaphragm 16 through a leaf spring 162 having bosses 163 and 164 secured thereto and contacting with the diaphragm. This leaf spring 162 is normally bowed away from the diaphragm 16 so that the lever 17 acts against said spring in thrusting the diaphragm 16 downwards to shut off communication between the cavities 18 and the chamber 19.

The reservoir D has a main chamber 20 and a sub-chamber 21 communicating with each other through the aperture 22. The conduits 111 from the actuators X and Y and the conduit 14 all communicate with the sub-chamber 21. Located below the aperture 22 is a loose valve member 23, which, when the reservoir is turned upside down, falls into a position which prevents fluid flowing from the sub-chamber 21 to the main chamber 20. On the top of the reservoir an air vent is provided which is also closed when the reservoir is turned upside down by the ball valve 24.

In operation the pipe systems and cylinders of the actuators and braking mechanisms are filled with a suitable pressure liquid and it will be seen that normally the brake or brakes may be operated from either control position or by the simultaneous operation of the actuators of both control positions. By means of this simultaneous operation an instructor in the first control position can augment the pressure applied to either brake by a pupil in the second control position. Where the occupants of both control positions have operated the actuators for one or both brakes the occupant of the pupil's control position cannot reduce the braking pressure applied until the occupant of the instructor's position has ceased to operate his actuator or actuators for operating the brakes. Should the pupil operate either or both actuators X and Y in such a manner as to put on the brake or brakes excessively or should the instructor for some other reason desire to release the pupil's operation of the brake or brakes, he can do so by operating the lever 17 to open the valve C and by-pass the pressure liquid from the actuators X and Y into the reservoir D where the liquid will remain until the pistons of the actuators X and Y are returned to the positions at which the chambers 9 of said actuators have their maximum capacity. The reservoir D is positioned in the aircraft so as to be above the actuators A, B, X and Y and consequently when the pistons of the actuators X and Y reach the position which has just been described the pressure liquid will flow back under gravity by way of conduits 111 to the chambers 9 of the said actuators.

Since the valves 12 of the actuators A and B close the communication between the chambers 9 of these actuators and the conduits 11 leading from them as soon as the actuators are operated to apply pressure to the brakes, the opening of the valve C does not prevent the continued operation of the brake or brakes by the operation of the actuators A or B of the instructor's position but allows braking to continue unhampered by any interference from the occupant of the pupil's position.

The reservoir D also serves to keep the pipe systems and braking mechanisms replenished with pressure liquid. The valve 23 prevents fluid flowing from the pipe systems into the reservoir when the aircraft is flying upside down and the ball valve likewise prevents the escape of fluid from the reservoir when the aircraft is in that position.

Many modifications may be made in the form of the invention which has been described. The invention may be applied to brakes operated by air or another gas. In the case of brakes operated by compressed air the conduit or conduits from the actuator or actuators at the pupil's position are led to the brake or brakes through the actuator or actuators at the instructor's position and a valve is provided by which, at the will of the occupant of the instructor's position, the air from the actuator or actuators at the pupil's control position may be exhausted to atmosphere and the conduit from the said valve to the brake or brakes closed so as to allow the continued operation of the brakes by the occupant of the instructor's position.

I claim:

1. For the operation of aircraft wheel brakes actuated by fluid pressure, a control mechanism comprising actuators, each of which is constituted by a fluid-pressure control device, situated in the aircraft at an instructor's position and also at a pupil's position from either of which positions the brakes may be operated by said actuators, and means operable from the instructor's position to divert fluid under pressure from an actuator at the pupil's position away from the brake mechanism to render the last-mentioned actuator inoperative and at the same time leave the actuators at the instructor's position capable of operation upon the brake mechanism.

2. For the operation of aircraft wheel brakes actuated by pressure fluid, a control mechanism comprising actuators, each of which is constituted by a fluid-pressure control device, situated in the aircraft at an instructor's position and also at a pupil's position from either of which positions the brakes may be operated by said actuators, means to provide a fluid connection between an instructor's actuator and the brake mechanism, and means to provide a fluid connection between a pupil's actuator and a corresponding instructor's actuator in such a manner that operation of the latter actuator renders the aforesaid pupil's actuator incapable of releasing fluid pressure applied to the brake mechanism.

3. For the operation of aircraft wheel brakes actuated by fluid pressure, a control mechanism comprising actuators situated in the aircraft at an instructor's and also at a pupil's position from either of which positions the brakes may be operated, fluid conduits providing communication between the instructor's and the pupil's actuators and the brake mechanism, and means operable at will from the instructor's position to prevent flow of pressure fluid from the brake mechanism at least in a direction towards the pupil's actuator, and means to divert away from the latter pressure fluid subject to the control of the pupil's actuator, without interruption of communication between the corresponding instructor's actuator and the brake mechanism.

4. A control mechanism according to claim 3 wherein the conduit providing communication between a pupil's actuator and the brake mechanism comprises, as part of it, at least a portion of the conduit providing communication between the corresponding instructor's actuator and the brake mechanism, and wherein a valve is provided to control the remaining part of the conduit leading from the pupil's actuator to the brake mechanism.

5. For the operation of aircraft wheel brakes actuated by liquid under pressure, a control mechanism comprising actuators, each of which comprises a pressure producing device, situated in the aircraft at an instructor's position and also at a pupil's position from either of which positions the brakes may be operated, fluid conduits affording communication between a pupil's actuator and the brake mechanism and between the instructor's actuator and the brake mechanism, a valve to prevent flow of fluid pressure from the mechanism to the pupil's actuator, operating means for the valve operatively connected to the corresponding instructor's actuator so as to open the valve to allow pressure fluid to flow from the brake mechanism to the pupil's actuator only when the said instructor's actuator approximates to its inoperative position, a reservoir, and means operable at will from the vicinity of the instructor's position and in direct communication with the pupil's actuator to divert pressure fluid therefrom to the said reservoir.

6. For the operation of aircraft wheel brakes a control mechanism according to claim 5 wherein the conduit providing communication between a pupil's actuator and the brake mechanism comprises, as part of it, at least a portion of the conduit providing communication between the corresponding instructor's actuator and the brake mechanism and wherein the junction between the two conduits is located in the structure of the instructor's actuator and wherein a valve is located in the said structure adapted to close, at the junction, the opening of the conduit leading from the pupil's actuator, and an operative connection is provided between said valve and the said instructor's actuator.

7. For the operation of aircraft wheel brakes actuated by liquid under pressure, a control mechanism comprising actuators, each of which comprises a pressure producing device, situated in the aircraft at an instructor's position and at a pupil's position from either of which positions the brakes may be actuated, a first conduit providing direct communication between an instructor's actuator and the brake mechanism, a second conduit providing communication between a pupil's actuator and the corresponding instructor's actuator, a valve located within the structure of said instructor's actuator to close the end opening of said second conduit, operating means for the valve operatively connected with said instructor's actuator so as to open the valve only when the instructor's actuator approximates to its inoperative condition, a by-pass conduit joining the aforesaid second conduit, a reservoir communicating with the by-pass conduit, and a valve in said by-pass conduit in combination with operating means therefor operable at will from the vicinity of the instructor's position.

8. A control mechanism according to claim 7 having a conduit connecting a pupil's actuator with the reservoir and a valve located in said conduit in combination with operating means therefor such as to open the valve to allow liquid to flow from the reservoir into the actuator only when the latter approximates to a normal position of rest.

9. A control mechanism according to claim 7 provided with an automatically operative valve which comes into operation only when the aircraft is inverted to shut off communication between the reservoir and the conduits passing to the actuators and brake mechanisms.

10. A control mechanism according to claim 7 wherein the reservoir is provided with an air vent passage at its upper end and an automatically operative valve for closing said passage, which valve only comes into operation when the aircraft is inverted.

11. A control mechanism according to claim 7 having a pair of actuators at the instructor's position and a pair of actuators at the pupil's position, and having the actuators of each pair separately associated with and connected to the brake mechanisms situated on opposite sides of the centre line of the aircraft so that the brakes may be used for the purpose of steering when the aircraft is on the ground, and having also the pair of pupil's actuators directly connected in common to the reservoir communicating with the by-pass conduit.

FREDERICK JOHN TARRIS.